W. ERNI.
WASHING MACHINE BEARING.
APPLICATION FILED MAR. 1, 1918. RENEWED JULY 2, 1921.
1,403,306.
Patented Jan. 10, 1922.
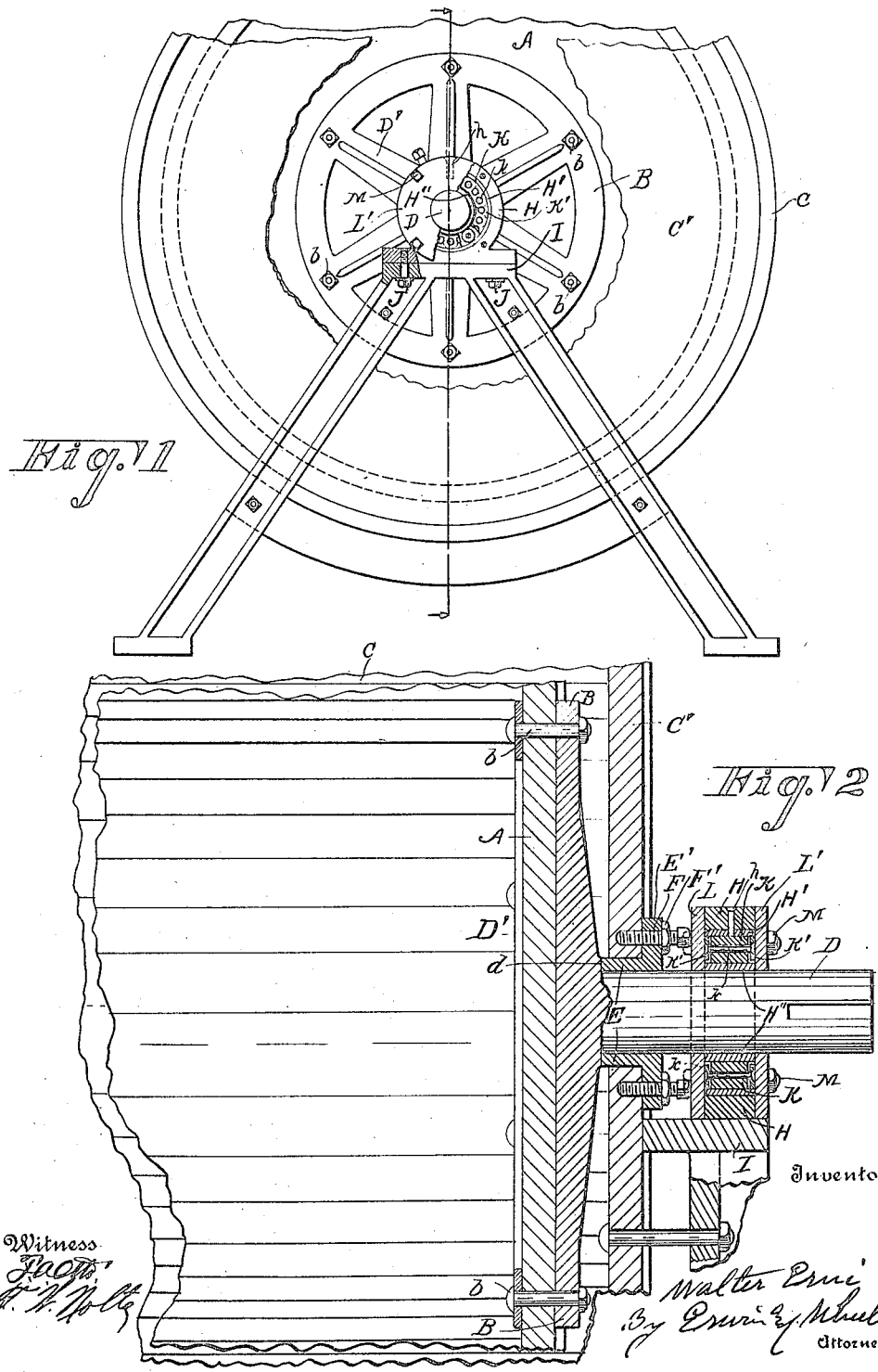

UNITED STATES PATENT OFFICE.

WALTER ERNI, OF MARKESAN, WISCONSIN, ASSIGNOR, BY MESNE ASSIGNMENTS, TO WATERHOUSE LAUNDRY, MACHINERY & SUPPLY COMPANY, OF DETROIT, MICHIGAN, A CORPORATION OF MICHIGAN.

WASHING-MACHINE BEARING.

1,403,306.  Specification of Letters Patent.  Patented Jan. 10, 1922.

Application filed March 1, 1918, Serial No. 219,796. Renewed July 2, 1921. Serial No. 482,194.

*To all whom it may concern:*

Be it known that I, WALTER ERNI, a citizen of the United States, residing at Markesan, county of Green Lake, and State of Wisconsin, have invented new and useful Improvements in Washing-Machine Bearings, of which the following is a specification.

My invention relates to improvements in bearings for washing machines of the rotary drum type. The object of my invention is to prevent water and sediment from getting into the bearings. Water, and particularly water containing caustic cleansing material, is very apt to corrode the bearings of a washing machine under the conditions existing in a laundry, and bearings which become corroded, or into which sediment has been carried by the water, are very quickly cut out and destroyed.

A further object of my invention is to provide a bearing which can be readily taken apart, cleaned, oiled and replaced; also to provide a form of construction which is simple, inexpensive, and durable.

In the drawings:

Figure 1 is a fragmentary view of a rotary drum washing machine, in end elevation, showing my improved bearing.

Figure 2 is a sectional view of the same, drawn to a plane cutting the axis of the drum, but showing the drum supporting trunnion in full.

Like parts are identified by the same reference characters throughout both views.

A is the end wall of a washing machine drum, and C is the wall of the tank in which the drum rotates. D is one of the drum supporting trunnions. These parts may be of any ordinary construction, except as hereinafter stated.

The trunnion D is connected with the end wall A of the drum by a circular plate B secured to the wall by bolts *b*. The end wall C' of the tank is provided with a bushing E, having a radial flange E' connected by bolts F with the wall C'. The bolts are provided with nuts F' which are used to clamp the bushing in position, independently of the position of the bolt itself, which may be adjusted inwardly or outwardly for the purpose of determining the position of the bearing, as hereinafter explained. The inner end of the bushing bears upon the thickened portions *d* of the plate D'.

The peripheral portion of the roller bearing comprises a ring H, which is integrally connected with a cap plate secured to the top of the supporting standard I by bolts J, as best shown in Figure 1. The rollers K are located within this ring H, a bushing H' being interposed and constituting a race way. Another bushing H", concentric with the bushing H', is mounted on the shaft or trunnion D.

Side disks L and L' constitute the side walls of the bearing, and prevent the rollers from slipping out longitudinally. These side disks are, of course, apertured to receive the shaft or trunnion, and are clamped in position against the ends of the bushings H', and against the ends of the ring H. The clamping bolts M pass through apertures in the disks and in the ring H, as clearly shown in Figure 2.

The inner disk L cannot shift in position because it is anchored between the ring H and the heads of the bolts F, said bolts being adjusted in such a manner that the heads of the bolts serve as clamping members to bind this disk in position. The outer disk L' may be removed by unscrewing the nuts from the clamping bolts M, and when the outer disk is removed the ends of the rollers will be exposed, and the rollers may, if desired, be removed. The outer bushing H' is preferably secured to the ring by screws *h*. The inner bushing may be keyed or pinned to the shaft, or it may be shrunk on the shaft, if desired. I preferably secure these bushings in order to avoid any tendency to rotation in case one of the rollers should become damaged or broken. If the bushings are damaged or worn they can be easily replaced, whereas, if allowed to rotate relatively to their supports, damage to the rollers might not become apparent until damage to the outer ring, (or shaft) resulted.

Owing to the fact that the disks L and L' are tightly clamped against the ends of the ring H, and the end of the bushing H', it is obvious that if the surfaces are finished with reasonable accuracy a water-tight joint will be produced. It is also obvious that the water cannot follow along the shaft into the bearing as has heretofore been the case. For even if the water passes between the disk L, and the shaft rotating therein, it cannot pass outwardly between this disk and the ends of the bushing H". If it passes through this bushing it does no harm, for this bushing is keyed, or otherwise rigidly affixed to the shaft, and turns with it, the ends of the bushing constantly tending to wear smooth by reason of the frictional contact of the stationary disks under the clamping pressure exerted by these disks. It will, of course, be understood that no binding pressure will be exerted by the disks upon the ends of the bushing H", owing to the fact that the clamping bolts are near the outer margins of the disks, and the inner portion of the ring H, and also the bushing H', serve as spacers for the disks.

The object of anchoring the inner disk L by means of the screws M is to allow the outer disk L' to be removed for an inspection of the bearing when the machine is in operation, without opening up the bearing on the inner side to admit water thereto.

It will be observed that the rollers K are provided with cage rings K', each roller having an axial support, or shaft, k connecting the cage rings, and about which the roller rotates. The cage rings revolve about the shaft while the rollers are rolling along the surface of the inner bushing, the cage operating in a well known manner to keep the rollers parallel with each other.

I claim:

1. A bearing for rotary washing machines, including the combination with a rotary shaft, of a standard provided with a cap plate provided with a fixed ring through which said shaft projects, a race way mounted on the shaft and anchored thereto within the ring, rollers interposed between the race way and the ring, and disks clamped to the ring and embracing the race way to exclude water from the space occupied by the rollers said disks having apertures through which the shaft passes.

2. A bearing for rotary washing machines, consisting in the combination with a washing machine drum provided with a disk shaped end plate, having a centrally projecting trunnion, a bushing for said trunnion, adjustable screws, provided with clamping nuts, adapted to secure the bushing to a suitable support, a race-way on the shaft, anchored thereto, a relatively stationary ring concentric with the race-way, rollers interposed between the race-way and the relatively stationary ring, an end disk interposed between the inner ends of the stationary ring and the clamping screws of the bushing, and an outer disk clamped to the interposed disk and to said ring, and engaging the outer end of the race-way.

3. A washing machine bearing comprising the combination with a supporting shaft, provided with a cylindrical race-way of greater diameter than the shaft, and anchored thereto, a relatively stationary concentric ring, a set of disks clamped to the respective ends of the ring and closing the ends of the annular space between the ring and raceway, clamping bolts extending through the ring, and engaging the disks at their respective sides, and rollers interposed between the race-way and ring, said disks being apertured to receive the shaft, and being held by the clamping bolts in water-tight relation to the ends of the raceway on the shaft.

4. A washing machine bearing comprising the combination with a supporting shaft, provided with a race-way of greater diameter than the shaft, and anchored thereto, a relatively stationary concentric ring, a set of disks clamped to the respective ends of the ring, clamping bolts extending through the ring, and engaging the disks at their respective sides, rollers interposed between the race-way and ring, said disks being apertured to receive the shaft, and being held by the clamping bolts in water-tight relation to the ends of the race-way on the shaft, and said rollers being provided with axial supports, and cage rings for guiding the rollers in parallel positions.

5. A washing machine bearing, including the combination of a shaft, provided with a relatively fixed race-way of greater diameter than the shaft, a relatively stationary outer ring, concentric with the race-way, and provided with a lining bushing, rollers interposed between the bushings and said raceway, cage rings for guiding the rollers, and end disks secured to the outer ring in watertight relation to the ends of the sleeve bushing on the shaft.

In testimony whereof I affix my signature in the presence of two witnesses.

WALTER ERNI.

Witnesses:
 IRA W. PARKER,
 GUY MILLER.